Aug. 23, 1932.   W. J. COULTAS   1,873,295
SHAFT BEARING FOR CORN HARVESTERS
Filed Nov. 9, 1929
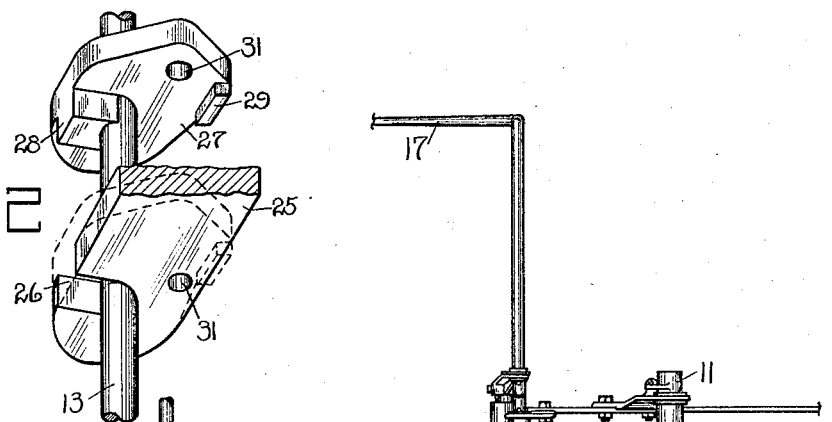
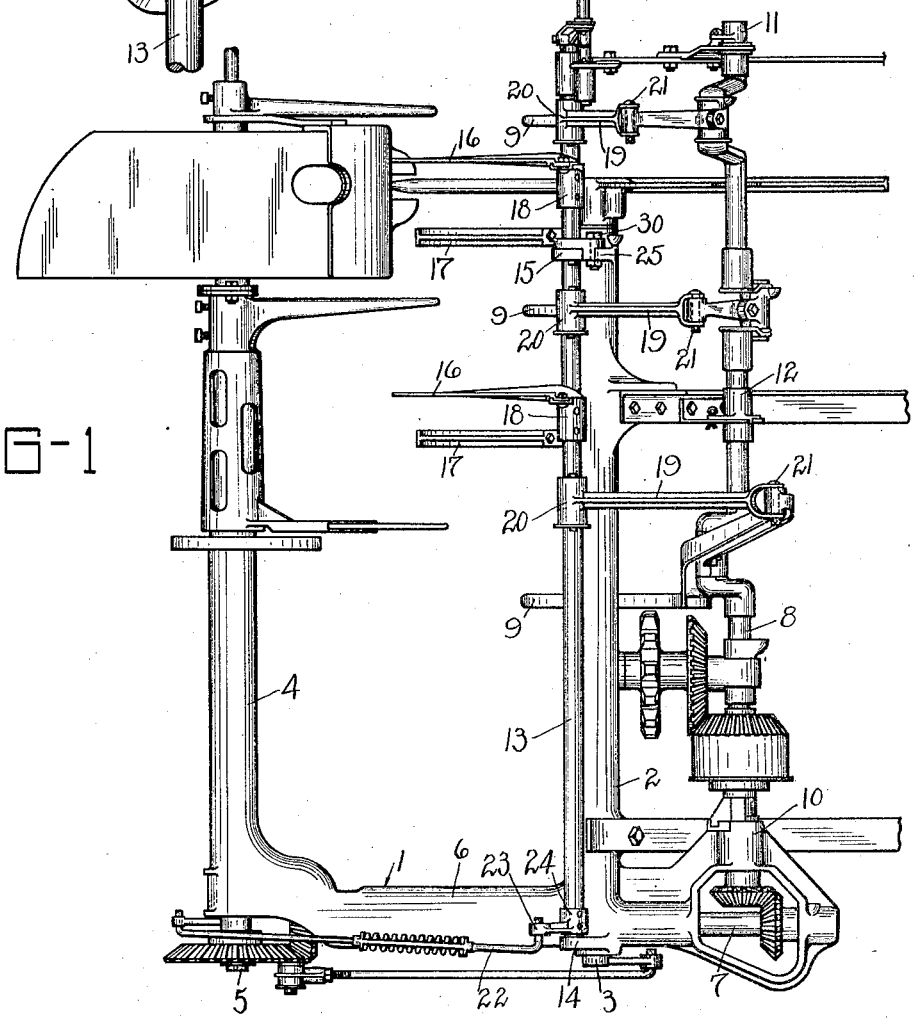
INVENTOR
WILBUR J. COULTAS
WITNESS Patented Aug. 23, 1932

1,873,295

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

SHAFT BEARING FOR CORN HARVESTERS

Application filed November 9, 1929. Serial No. 405,857.

My invention relates to that type of corn harvesters in which the stalks are cut and conveyed in a standing position to a receiving section of the harvester in which a bundle is formed and bound and from which it is finally ejected and my invention has for its object improvement of certain parts of the mechanism to more readily effect their removal or replacement as hereinafter fully explained.

Referring to the drawing in which similar numerals indicate identical parts—

Figure 1 is a view in part of the bundle forming and binding end of a corn harvester embodying my invention; and, Figure 2 is an enlarged detail, in perspective, of my improvement.

In the hard work of harvesting corn, damage to the parts mounted on the trip shaft of the binder mechanism occasionally results and to make repairs it is necessary to remove the shaft, and the parts mounted on it. Heretofore it has been necessary to loosen the various parts on the trip shaft so that the latter can be withdrawn therefrom vertically, the upper bearing in which the trip shaft is journaled, and to which my improvement relates, being solid as commonly constructed, and the packer links and trip arms being sleeved upon the trip shaft and held rigidly thereon by rivets or keys which would have to be removed before the trip shaft could be dismounted from the machine. By the use of my invention, however, the trip shaft can be readily removed from the machine without separating from the shaft the various parts mounted upon it as clearly set forth hereinafter.

Illustrating sufficient of a binder mechanism, of which my invention forms a part, 1 is the binder frame, of the usual type in the section 2 of which is journaled the needle shaft 3, and in the section 4 is journaled the knotter shaft 5. In the section 6 of the frame, connecting the sections 2 and 4, is journaled the shaft 7. The crank shaft 8 is the power shaft and on it are mounted the packers 9. The crank shaft 8 is supported in a bearing 10 on the frame 1 and in bearings 11 and 12 on parts of the harvester frame structure. The shafts mentioned are connected together by suitable gearing. The parts heretofore described are common in the art, are well known commercially and are only cited to clearly locate my invention.

The lower end of the trip shaft 13 is supported in a bearing 14 on the lower part of the frame 1 and in a bearing 15 on the upper part of the section 2 of said frame; the trip shaft carries the usual trip arms 16 and retarding arms 17 and operates to trip the binding and discharging mechanism. The trip arms 16 are mounted on sleeves 18, through which the trip shaft extends, and are secured rigidly to the shaft by rivets or bolts. The packer links 19 have similar sleeves 20 keyed or otherwise secured to the trip shaft 13, the links 19 being attached to the packers in the ordinary manner by suitable pins 21. The trip shaft has the usual spring controlled rod connection 22 with the tying device, one end of the rod being formed to engage with an arm 23 integral with a sleeve 24 riveted on the lower part of the trip shaft.

My invention, however, concerns the bearing 15 which consists of a projection 25, on the section 2 of the binder frame 1, which is provided with an open slot 26, to receive the trip shaft, and to hold the trip shaft securely therein is a member 27 mounted to slide on the shaft 13 so as to readily coact with the projection 25 to hold the shaft in place; the member 27 being provided with a lug 28 which fits snugly in the slot 26, and a lug 29 to extend downwardly in rigid contact with a side of the projection 25, the member 27 and projection 25 being held firmly together by a bolt 30 inserted through holes 31 in the projection 25 and member 27.

Now, considering the bearing 15 as solid it will be at once apparent that to remove the trip shaft from the machine the rivets of the sleeves 18 and 24 will have to be cut, and the keys in the sleeves 20 removed so that the shaft 13 can be raised vertically free of its bearings, trip arms 16 and packer links 19. It is easily understood that to replace the trip shaft and again mount thereon the trip arms 16, packer links 19 and the arm 24 requires considerable patient labor and considerable time, but with the use of my improved bearing 15 it is only necessary to remove the pins 21 connecting the packer links to the packers, disconnect the rod 22 and the arm 23, remove the bolt 30 and raise the member 27 from the projection 25, after which the shaft can be freed from the projection 25 and lifted from the bearing 14 carrying with it the trip arms 16 and the packer links 19, the packer links and trip arms retaining their original positions on the trip shaft.

When desired repairs have been made it is very evident that the trip shaft and parts mounted thereon can be readily restored to its position on the machine and the parts mounted thereon attached as they were before it was desirable to remove the trip shaft, and after the latter is restored to its position on the machine, the member 27 is again moved to engage the lug 28 with the slot 26 and the lug 29 into contact with a side of the projection 25, then the bolt 30 is reinserted in the holes 31 and the trip shaft is again securely in place, the lower end thereof resting in the bearing 14.

What I claim is—

1. In a corn harvester, the combination of a binding mechanism including a frame upon which the operating parts of the mechanism are mounted, a trip shaft, a first bearing in which one end of said shaft is journaled, a second bearing in which the other end of said shaft is journaled, an arm fixedly mounted on said shaft intermediate said bearings, said second bearing being formed of dual parts, one of said parts permanently on the frame and having an open slot to receive the shaft, the second part slidably mounted on the shaft and movable to interlocking engagement with the first part, a lug on the movable part operating to close the slot and complete the bearing, and disconnectible means to secure the dual parts together, whereby said shaft may be removed from the frame without having to remove said arm from the shaft, by disconnecting said securing means, moving said second part longitudinally of the shaft, moving the shaft out of said slot and then axially out of said first bearing.

2. In a corn harvester, the combination of a binding mechanism including a frame upon which the operating parts of the mechanism are mounted, a trip shaft, a bearing in which said shaft is journaled formed of dual parts, one of said parts permanently on the frame and having an open slot to receive the shaft, the second part slidably mounted on the shaft and movable to interlocking engagement with the first part, a lug on the movable part operating to close the slot and complete the bearing, a lug on the second part to contact with a side of the first part as the parts are brought together, and means to secure the dual parts together.

WILBUR J. COULTAS.